July 1, 1930.  W. J. WHITING  1,768,813
METHOD OF INCREASING THE CHROMA OF A COLOR
Original Filed Nov. 27, 1926   2 Sheets-Sheet 1

WILLIAM J. WHITING,
Inventor
Attorneys

July 1, 1930.  W. J. WHITING  1,768,813

METHOD OF INCREASING THE CHROMA OF A COLOR

Original Filed Nov. 27, 1926  2 Sheets—Sheet 2

Inventor
WILLIAM J. WHITING,
By Spear, Middleton, Donaldson & Hall
Attorneys

Patented July 1, 1930

1,768,813

UNITED STATES PATENT OFFICE

WILLIAM J. WHITING, OF WASHINGTON, DISTRICT OF COLUMBIA

METHOD OF INCREASING THE CHROMA OF A COLOR

Original application filed November 27, 1926, Serial No. 151,129. Divided and this application filed March 4, 1930. Serial No. 433,099.

This application is a division of my original application for Letters Patent for "Methods for producing a light effect," filed November 27, 1926, Serial No. 151,129.

The present invention is concerned with the application of radiation of a predetermined, coordinated spectral composition in new and useful ways of increasing a radiation effect dependent upon the range and character of the included wave lengths relative to the dominant wave length of the radiation.

As restricted to visual effects, the invention is concerned with the utilization of light of a special composition in new and useful ways of increasing the chroma of a chromatic color, especially while leaving an achromatic color unaffected.

In the carrying out of this invention the inventor contemplates utilizing and applying not only the restriction when desirable, of the spectrum of the chromatic color, simultaneous contrast, etc., but also, when desired or necessary, coordinated invisible spectral differences of an improved form, also of his invention as disclosed in his said original application, wherein the different spectral compositions have the same center of gravity, one or more of the compositions include bright spectral bands separated by a dark band, and in cases where a plurality of compositions have the banded spectrum the coordination of the spectral positions of these bands in the respective compositions, whereby various desirable similarities in effect are maintained in conjunction with the use of objectively differing spectrums, while simultaneously the spectral difference is utilized to produce accentuations and changes in effect.

The general object of my invention is the accentuation of a radiation effect dependent upon the range and character of the included wave lengths relative to the dominant wave length of the radiation, this being accomplished by restricting the radiation to wave lengths having a desired purity of effect and wave lengths having a strongly contrasting radiation effect as used, and, when desired, further restricting the radiation to the spectral center of gravity of the unrestricted radiation.

As restricted to visible light the general object of my invention is the increase of the chroma of a chromatic color in a scene, by utilizing light having a spectral composition which includes only a desirable portion of the spectrum of the chromatic color, and light approximately complementary to this portion, and having simultaneous contrast therewith.

Another object of my invention is the increase of the chroma of a chromatic color in a scene by light subjectively of the appearance of an ordinary illuminant, by illuminating the scene by light having the same spectral center of gravity as the said ordinary illuminant, and the same hue, but having an objective difference of spectral composition, this restricted composition being coordinated with the spectrum of the chromatic color, including substantially only a desirable portion thereof, and light approximately complementary thereto.

Another object of my invention is the increase of the chroma of a chromatic color in a scene while simultaneously maintaining achromatic an achromatic color also in said scene, by restricting the light reaching the eye to a composition which includes substantially only the highly chromatic portion of the spectrum of the chromatic color, and light having a strong color contrast therewith, the said light of restricted spectral composition having the same spectral center of gravity as a selected ordinary illuminant.

Another object of my invention is the alternate accentuation of two different chromatic colors, while maintaining achromatic colors constantly achromatic, by utilizing alternately light subjectively similar, and having the same spectral center of gravity, but having an objective difference of spectral composition coordinated respectively with a different one of the chromatic color spectrums in a manner to cause the desired effect.

In carrying out my invention as above described, I contemplate the production of light of definite predetermined wave lengths and energy distribution by any suitable method, and likewise the utilization of suitable selectively reflecting or selectively transmitting filters, or any suitable selective element, to restrict the light reaching the eye. I further contemplate the manufacture of suitable filters, and apparatus for utilizing the same.

I have illustrated in the drawings certain diagrams as an aid to a better understanding of my invention, in which.

An invisible partial spectral difference is shown by pairing Figs. 8 or 10 with Figs. 1, 12 or 14.

Figure 1:
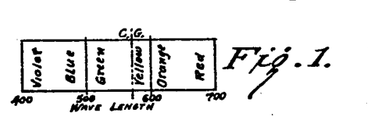
Figure 1 is a diagram of the visible continuous spectrum of ordinary white light, the position and wave lengths of the six principal colors being indicated. The spectral center of gravity is at CG.
Figure 2:
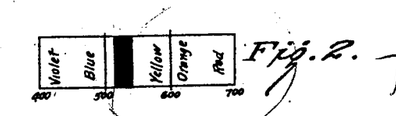
Fig. 2 shows the spectrum of a light from which the spectral green rays are absent.
Figure 3:
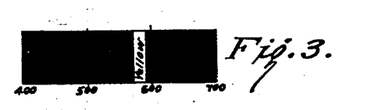
Fig. 3 shows the spectrum of a light composed of substantially spectral yellow rays only.
Figure 4:
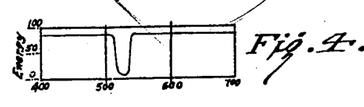
Fig. 4 is a diagrammatic energy graph of the spectrum shown in Fig. 2.
Figure 5:
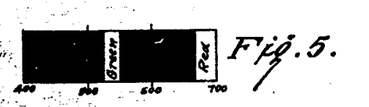
Fig. 5 shows the spectrum of a physiological yellow light which appears to an observer identical with the light composed of spectral yellow shown in Fig. 3.
Figure 6:
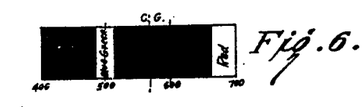
Fig. 6 shows the spectrum of a light which appears white to an observer, i. e., is a physiological white. The spectral center of gravity is at CG.
Figure 7:
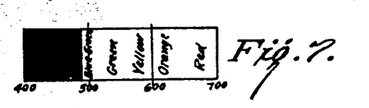
Fig. 7 shows the continuous spectrum of ordinary physiological yellow light, such as is reflected by ordinary yellow dyes, pigments, and the like in daylight or substantially as given by a tallow candle, but which appears to an observer identical with the yellows shown in Figs. 3 and 5 respectively.
Figure 8:
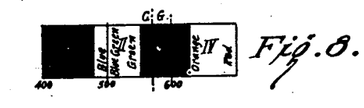
Fig. 8 and Fig. 10 show the spectrums of two physiological whites having an invisible complete spectral difference. The center of gravity of each spectrum is at CG.
Figure 9:
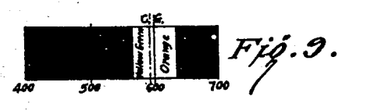
Fig. 9 and Fig. 11 show the spectrums of two physiological yellows with an invisible complete spectral difference. The center of gravity of each spectrum is at CG.
Figure 10:
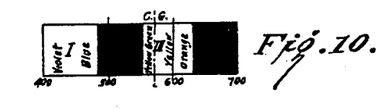
Figure 11:
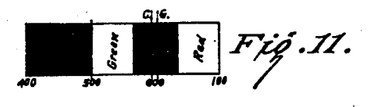
Figure 12:
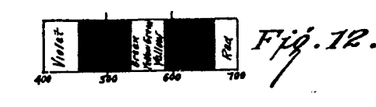
Fig. 12 and Fig. 14 show another pair of physiological whites having an invisible complete spectral difference, but a common chromatic effect in red.
Figure 13:
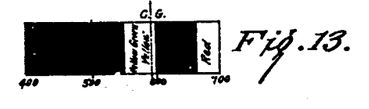
Fig. 13 and Fig. 15 show the spectrums of another pair of physiological yellows having an invisible spectral difference. The center of gravity of each spectrum is at CG.
Figure 14:
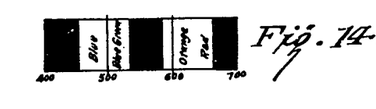
Figure 15:
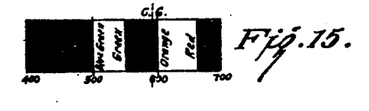
Figure 16:
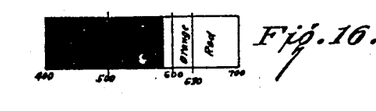
Fig. 16 shows the continuous spectrum of ordinary physiological red, any part from 630 millimicrons to 700 mm. being spectral red.
Figure 17:
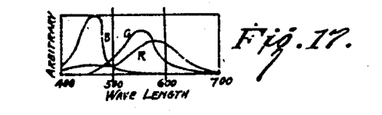
Fig. 17 is a diagrammatic graph showing the relative effect on the different color sensations by rays of different wave lengths. The blue, green and red curves are indicated respectively by B, G, and R.
Figure 18:
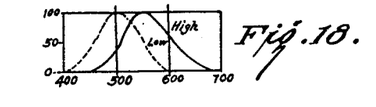
Fig. 18 is a diagrammatic graph showing the relative luminosity of different wave lengths at the same energy. The continuous line applied for high luminosities, the broken line for low luminosities.
Figure 19:
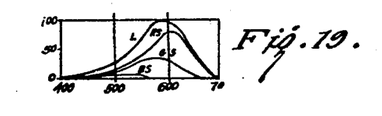
Fig. 19 is a diagrammatic graph showing the red, blue and green sensation curves in terms of luminosity.
Figure 20:
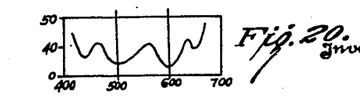
Fig. 20 is a diagrammatic graph showing the wave length increments necessary for discrimination of hue difference of spectral colors. Abscissas are wave lengths, ordinates are wave length changes required to cause hue difference.
Figure 21:
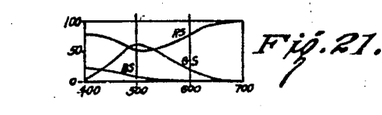
Fig. 21 is a diagrammatic graph showing the per cent of red, green and blue sensations in spectral colors in terms of luminosity.
Figure 25:
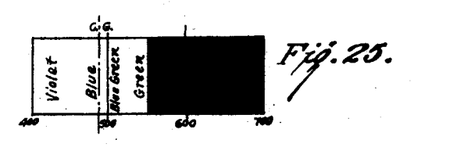
Fig. 25 is a diagrammatic spectrum representing the composition of ordinary blue. CG shows the center of gravity of the composition.
Figure 26:
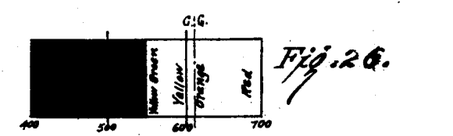
Fig. 26 shows the composition of ordinary orange, and its center of gravity at CG.
Figure 27:
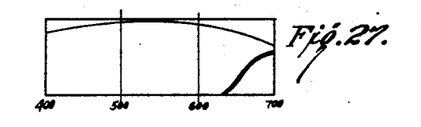
Fig. 27 shows diagrammatic spectrophotometric curves of the spectral compositions of two illuminants, the light line representing daylight, the heavy line a red light differing from daylight in hue, luminosity, center of gravity, and required focus.
Figure 28:
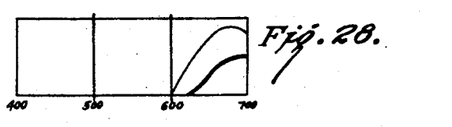
Fig. 28 shows the spectral compositions of two red illuminants, indicated by the light and heavy line respectively, which have the same subjective hue, but differ in luminosity, center of gravity and required focus.
Figure 29:
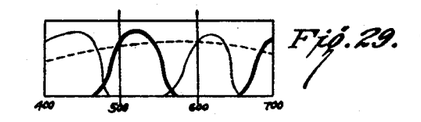
Fig. 29 shows the spectral compositions of three illuminants each of which appears white to an observer, and has substantially the same luminosity, center of gravity and required focus, a light broken line representing daylight, a light unbroken line and a heavy line indicating respectively two compositions consisting each of two bright bands separated by a dark band.
Figure 30:
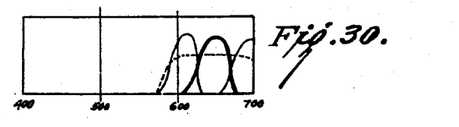
Fig. 30 shows the spectral composition of three red illuminants which have the same subjective hue, center of gravity, required focus, and luminosity.
Figure 33:
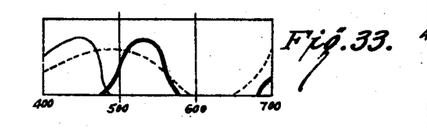
Fig. 33 shows the three different spectral compositions of light reflected by the same suitably colored object when illuminated respectively by each of the illuminants shown in Fig. 29, using corresponding line symbols.
Figure 34:
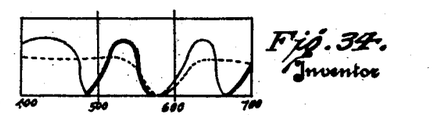
Fig. 34 shows three different spectral compositions reflected by a suitably colored object when illuminated respectively by each of the illuminants shown in Fig. 29, using corresponding line symbols.
Figure 35:
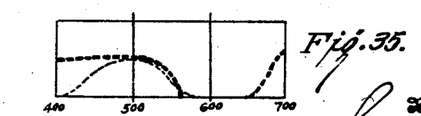
Fig. 35 shows two spectral compositions having an invisible spectral difference under one of the three illuminations shown in Fig. 29, a visible difference under either of the other two, and under one of these two illuminants a visible difference of each from either as seen under either other illumination.

It is well known that the ordinary spectral composition of an achromatic color includes radiation of nearly equal energy in all spectral colors as shown for white in Fig. 1, and that if one or more of these spectral colors is missing in the spectrum, as in Figs. 2 and 4, the result is a chromatic color, and that ordinary chromatic colors include a plurality of spectral colors in their composition, for example as shown for yellow in Fig. 7, red in Fig. 16, orange in Fig. 26 and blue in Fig. 25. Also that nearly all natural colors include at least a small portion of nearly every spectral color, the actual hue being due to a preponderance of radiant energy at or about a certain position in the spectrum, as shown for green by the broken line of Fig. 31, for red by the broken line of Fig. 32, and also for colors of higher chroma, for blue by the broken line of Fig. 33, and the light line of Fig. 35, and for purple by the broken line of Fig. 34.

Figure 31:
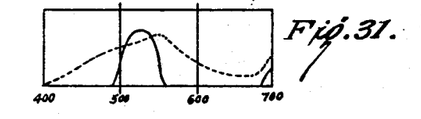
Fig. 31 shows by a light broken line the spectral composition reflected by an ordinary green object when illuminated by daylight, and by a heavy line the composition resulting from illumination by light of the composition shown by the heavy line in Fig. 29.
Figure 32:
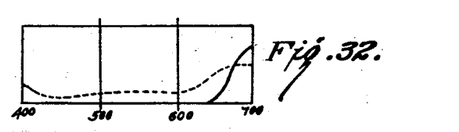
Fig. 32 shows the spectral composition reflected from an ordinary red object when illuminated by light of the same compositions as used in Fig. 31.

It is likewise well known that such colors can be "purified" or made to have greater chroma, by removing wave lengths which act to dechromatize, or desaturate the color, as shown by restricting the spectrum of Fig. 31 or Fig. 32 to the solid line. This can be done, obviously, by projecting light of the composition shown by the solid lines respectively of these figures on colors respectively of the composition of their broken lines, but when this illumination is general all colors are seen only by means of the red component of their composition; and as the eye soon adjusts itself to the monocolor, colors are seen light or dark in proportion to their content of spectral red, for instance, pure red appearing white, and pure green black under light of the solid line of Fig. 32. That is, one color in a scene cannot be accentuated by such illumination even though its spectrum is purified thereby.

Differences of hue and chroma in a scene are only possible when the scene contains colors of differing hue, or includes achromatic color, which implies that light of a plurality of spectral colors enters the eye and establishes a sensation for reference.

If, however, the blue light of Fig. 25 is thrown on the green light of either curve of Fig. 31, the reaction is still to dechromatize the green if the blue light illuminates the entire scene; and likewise if the red light of Fig. 26 is thrown on either curve of Fig. 32 under the same conditions. The colors appear brighter, but paler.

White light of ordinary composition is commonly accepted as the best illumination to give full value to differences of hue and chroma, but this can be improved upon.

In my invention I may place a self-luminous color in a scene otherwise illuminated by complementary light, thus accentuating the chroma of the luminous color by the effects of simultaneous contrast, or contrast of complementaries; but a color not self-luminous would be seen as black in the complementary light.

I obtain good results, however, by illuminating the scene by light of the desired purity of color combined with light approximately complementary thereto, or having strong color contrast therewith, or such as stimulates simultaneous contrast. By this means any desired purifying effect of restriction is obtained, and at the same time the accentuating effect of contrasting colors. The weakness of that portion of the original spectrum of the chromatic color which is included by the light complementary to the dominant hue-determining portion renders the latter's desaturating effects negligible, especially as it is not reinforced by the intervening portion now obliterated.

Now the light of my invention as described in other applications (Case A #151,129, filed Nov. 27, 1926 and Division B, #433,098, filed Mar. 4, 1930), having a banded spectral composition, and an objective spectral difference, but the same spectral center of gravity, and the same hue, includes many forms wherein the spectral composition consists of separated bright bands substantially complementary in position. That this is so is natural since complementary colors add to make white, and many compositions utilized in the procedure of the said Case A are of white light.

In the carrying out of my invention, therefore, I contemplate utilizing when suitable the light such, for example, as is shown in Figs. 5, 9, 11, 13, 15 by itself or in substitution for light apparently of the composition of Fig. 7, all these lights being yellow and subjectively similar, and having the same spectral center of gravity, and as shown in Figs. 6, 8, 10, 12, 14 and 29, by itself or in substitution for light of Fig. 1, all these lights being white, and having the same spectral center of gravity. I further contemplate narrowing the bright bands as used in the procedure of Case A and Division B, and shifting their positions, or broadening them to include additional portions as desired, and in general to adapt the procedure of the said Case A and Division B to include, where suitable and desirable, the chroma accentuation given by my present invention, and similarly, to utilize or adapt the light and procedure of Case A to the carrying out of the present invention where suitable or desirable. Approximately complementary colors sometimes have even greater contrast than accurately complementary colors.

Figure 22:
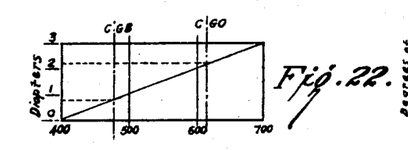
Fig. 22 is a diagrammatic graph showing the difference in ocular focus required for different spectral colors. The spectral center of gravity of blue of Fig. 25, and orange of Fig. 26, are shown respectively by CGB and CGO.
Figure 23:
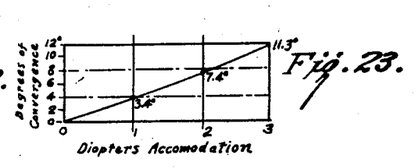
Fig. 23 is a diagrammatic graph showing the change in convergence of the eyes normally to be expected from changes in required focus, assuming no convergence required at relaxed accommodation.
Figure 24:
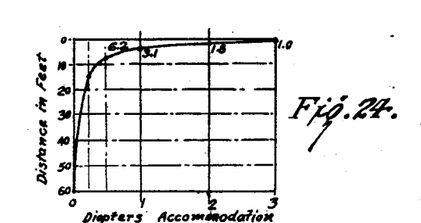
Fig. 24 is a diagrammatic graph showing the focus, or accommodation normally required and associated with various distances.

The use of light having the same center of gravity is especially important where effects are alternated, thus avoiding the focus, and convergence stimulation and change resulting from alternating differently colored lights, having a differing spectral center of gravity. The kind and extent of these bad effects are shown in Figs. 22, 23 and 24. Such focus and convergence difficulties, are also present, though less noticeable, also under contact colored illumination, and cause difference of perspective, of apparent distance, and in some colors cause eyestrain. The light of my invention prevents all harmful ocular change or strain.

I will now explain my invention in detail by some examples showing its utility and novelty.

Such a beam may be used to great advantage in the advertising, the theatrical field, or in illumination engineering, particularly where it is desirable to intensify certain subjective colors already objectively applied to or included in a picture, sign, scene or other object. Ordinarily this has been attempted by making use of light having visible color, and of an ordinary spectral composition. The results of such practice are poor, and also are what are recognized as normal color reactions. By the use, however, of light of the composition shown by the heavy line in Fig. 29, for example, a green object having, when illuminated by ordinary white light, the unsaturated green color shown in Fig. 31, broken line, is made to appear a brilliant highly saturated green of spectral composition shown in Fig. 31, heavy line, although the illuminating light still appears white.

Similarly for a red object as shown in Fig. 32, this intensificaton resulting from two causes, the purification of the desired color by spectral limitation, and intensification by simultaneous contrast with the general scene by limiting all color to the desired color and its approximate complement. Further, red and green objects can be intensified simultaneously by the same objective light. Like effects can be obtained in other colors, and other color reactions also be utilized.

In carrying out my invention as above described, I contemplate the production of light of definite, predetermined wave lengths and energy distribution, such for instance as is illustrated in Figs. 5, 6, 8, 9, 10, 11, 12, 13, 14 and 15, and Figs. 29 and 30, by any suitable method, such as by selection of a light source giving of itself the desired bright line or band spectrum, or by utilizing any suitable light source of continuous, or known spectrum, and actually forming its spectrum, and, after blocking out the undesired wave lengths recombining the light, or by utilization of a solective filter or filters in cooperation with a suitable light source. Such a filter may be selectively transmitting or selectively reflecting, and an object or scene or part thereof may itself serve as the filter. Likewise an object or scene may be in effect the light source.

I further contemplate in carrying out my invention the utilization of selectively transmitting or reflecting filters for the revelation of the subjective differences in effect of the two coordinated spectral compositions, and, where desirable, to use an illuminated object or a part of the scene as the filter. Any certain filter may be compounded of two or more cooperative or coordinated units.

I intend to utilize any suitable selectively transmitting or reflecting material for the above filters, necessary or desirable, either transparent, translucent or opaque, such as colored or flashed glass (glass holding selective absorbing material in solid solution) stained or dyed gelatin, collodion or the like, supported or unsupported by a transparent backing, such as glass, mica, celluloid, or the like (or placed or cemented between such transparent supports), or thin films of transparent pigments or dyes, liquid chemicals or solutions of inorganic or organic materials in cells, surfaces especially covered with thin or thick layers of pigments, dyes, lakes, inks or the like, or natural objects and surfaces.

However I have found that the class of coal tar dyes are peculiarly suitable for the making of transparent filters when used as a stain for gelatine, collodion or the like, or in solution, and also for the formation of reflecting filters, the dye being used either as stain or in the form of lakes. Such dyes enable one skilled in the art to prepare filters limiting light to any desired spectral composition both as to wave length and as to difference in relative energy at different wave lengths, and with the minimum loss of light, with the utmost precision, and permit delicate correction for light source, or other purposes. I have fully disclosed the desired manner of apportioning the spectrum. The particular dyes, etc., to be utilized obviously must depend upon the particular variation of a method chosen from among the several variations disclosed in the specification, and covered by the claims.

Obviously a separate unit can be used for each dye if desired. In certain cases, especially where single components of a composition are utilized separately, I find that colored glass units may be utilized with advantage singly or in combination. Also a stained film can be backed by a suitably colored glass or other material if desired. In other cases it is desirable to have either a partial or complete invisible spectral difference in the light sources, by utilizing, for example, a mixture of two or more salts to match the flame coloration caused by another salt.

In the claims by "scene" I mean anything, whether natural or artificial, which can be illuminated, or upon which light is or can be projected from differing directions.

Where I use the word "projection," I mean to include what is well known in the art as opaque or solid projection; obviously ordinary photography involves opaque projection, as does ordinary vision wherein ordinary objects are projected upon the retina. Further, I use "projection" to describe the control of the direction of light radiation, reserving the term "illumination" for use when I wish to use radiation uncontrolled in direction. Light radiating under the inverse square law is "projected" light if the size of the light source can be neglected in the manner the light source is utilized; for example, the outline of an object, silhouette, or a transparency, can be projected by simply placing said object or transparency in the path of light radiating from a relatively small source; i. e. projection is not confined to the action of a lens or reflector.

Obviously many effects obtained by illumination can also be obtained by projection, and many effects of projection can also be obtained by illumination, but not all. It is evident that "projected" light must illuminate, hence, in the claims, "projection" includes "illumination" as well; likewise the term "illumination" in the claims may include illumination by projection where that connotation is effective in the procedure of the claim; therefore in the claims, "projection" and "illumination" may each include the other, the distinction in use being confined to the clarification of the procedure.

As shown above, the element cooperating with the light source to produce light having the desired characteristics may not actually "filter," or such element may be a property of the light source, so that in the claims where I use the expression "character imparting element," I mean any device which will impart the desired character to the light. Likewise, the revealing filter does not necessarily include an actual "filtering" action, so that in the claims where I refer to a "revealing filter" I mean any means whereby the desirable subjective differences in effect of the two coordinated spectral compositions may be revealed, whether by filtration or not.

By dark spectral bands I means bands dark enough to cause the desired effect. This may require complete absence of light, or only a relative darkening compared to the bright bands.

I claim:

1. The method of producing a visual effect including an increase of the chroma of certain chromatic colors in a scene simultaneously with the substantial preservation of achromatic colors, which includes the steps of illuminating said scene by light of a spectral composition including bright bands separated by a dark band, and coordinating the spectral position of said bands with the spectrums of said colors, including in said bright bands portions of said colors which serve to increase the chroma of any of said chromatic colors, excluding portions which serve to dechromatize any of said chromatic colors, also including in said bands portions of said achromatic colors, the sum of which portions has substantially the same center of gravity as said acromatic colors.

2. The method of producing a visual effect inclding an increase of the chroma of certain chromatic colors in a scene simultaneously with the substantial preservation of achromatic colors, which includes the steps of illuminating said scene by light of a spectral composition including bright bands separated by a dark band, and coordinating the spectral position of said bands with the spectrums of said colors, each said bright band including in its spectral position a selected portion of the spectrum of a certain respective one of said chromatic colors, excluding undesirably dechromatizing spectral portions, said bright bands also including in their spectral position portions of the spectrum of said achromatic colors, the sum of these portions of said achromatic color spectrum having substantially the same spectral center of gravity as the spectrum of said achromatic colors.

3. The method of producing a visual effect including an increase of the chroma of certain chromatic colors in a scene simultaneously with the substantial preservation of achromatic colors, which includes the steps of illuminating said scene by light of a spectral composition including bright bands separated by a dark band, and coordinating the spectral position of said bands with the spectrums of said colors, each said bright band including in its spectral position a selected portion of the spectrum of a certain respective one of said chromatic colors, said bright bands being approximately complementary, said bright bands also including in their spectral position portions of the spectrum of said achromatic colors, the sum of these portions of said achromatic color spectrum having substantially the same spectral center of gravity as the spectrum of said achromatic colors.

4. The method of producing a visual effect including an increase of the chroma of certain chromatic colors in a scene simultaneously with the substantial preservation of achromatic colors, which includes the steps of illuminating said scene by light of a spectral composition including bright bands separated by a dark band, and coordinating the spectral position of said bands with the spectrums of said colors, each said bright band including in its spectral position a selected portion of the spectrum of a certain respective one of said chromatic colors, said bright bands including respectively light of colors having a strong simultaneous contrast, said bright bands also including in their spectral position portions of the spectrum of said achromatic colors, the sum of these portions of said achromatic color spectrum having substantially the same spectral center of gravity as the spectrum of said achromatic colors.

5. The method of producing a scene including unusual chroma, which includes the steps of illuminating the said scene by light having a predetermined spectrum consisting substantially of two bright bands, the light of the said respective bands having a strong simultaneous contrast and being approximately complementary, including in said scene predetermined chromatic colors of known spectral composition, the spectral composition of each said chromatic color being coordinated with the said spectrum of the said illuminating light and including a respective one of said bright bands.

6. The method of producing a visual effect including an increase of the chroma of a certain chromatic color in a scene, which includes the steps of illuminating the said scene by light of a predetermined spectral composition, including bright bands separated by a dark band, and coordinating the spectral position of the said bands with the spectrum of the said color, the spectral position of the said bands including certain predetermined desirable wavelengths of the said chromatic color, the light of the sum of the said wavelengths having more chroma than said color, the spectral center of gravity of the sum of all but one of said bright bands being approximately complementary to that of said one bright band.

7. The method of increasing the visibility of and differentiation of a certain chromatic color in an illuminated scene including other color which includes wavelengths complementary to the said chromatic color, which includes the steps of excluding from the observer's eyes by means of a suitable selective element, substantially all light except certain selected desirable wavelengths included in said chromatic color, and light approximately complementary thereto, whereby the chroma and brightness of said chromatic color is enhanced.

8. The method of increasing the visibility and differentiation of an undesirably unsaturated chromatic color, in an illuminated scene including other colors in part complementary to said chromatic color, said scene being illuminated by an ordinary illuminant, which includes the steps of excluding from the observer's eye by means of a suitable selective element, substantially all light except that of certain selected wavelengths of the said chromatic color, the light of the sum of which has a spectral center of gravity, and hue, substantially the same as those of the light of said chromatic color, but having greater chroma, and light approximately complementary to and having strong simultaneous contrast with the said light of said sum, whereby the chroma of the said chromatic color is enhanced.

9. The method of increasing the visibility and differentiation of an undesirably unsaturated chromatic color, in an illuminated scene including other colors in part complementary to said chromatic color, said scene being illuminated by an ordinary illuminant, which includes the steps of excluding from the observer's eye by means of a suitable selective element, substantially all light except that of certain selected wavelengths of the said chromatic color, the light of the sum of which has a spectral center of gravity, and hue, different from those of the light of said chromatic color, said new hue having greater capacity for saturation, and light approximately complementary to and having strong simultaneous contrast with the said light of said sum, whereby the chroma of the said chromatic color is enhanced.

10. The method of increasing the visibility and differentiation of a certain chromatic color in a scene including other color in part complementary to said chromatic color, which includes the steps of excluding by means of a suitable selective element, from the light reaching the observer's eye, wavelengths of said chromatic color which undesirably dechromatize said chromatic color, and substantially all wavelengths not included in said chromatic color, except those wavelengths approximately complementary to and having strong contrast with wavelengths of the light not excluded from said chromatic color.

11. In a method of altering the ratio of the hue, chroma and brightness components of a color by changing the spectral composition of the light subjectively illuminating said color, the steps of excluding from the said changed spectral composition of the said light certain dechromatizing wavelengths included in said color, and including in said changed spectral composition of the said light certain wavelengths substantially complementary to the utilized wavelengths of said color, and having a strong color contrast therewith.

12. The method of increasing chroma in an illuminated scene which includes the steps of coordinating the spectral composition of the light reaching the eye with the reflection spectra of objects in said scene having color, and restricting the light reaching the eye, by means of a suitable selective element, to light included in the reflection spectrum of a certain selected one of said object colors, and to light approximately complementary thereto, and having strong simultaneous contrast therewith.

13. The method of lending increased chroma to a certain chromatic color of known spectral composition which is included in a scene as one of a plurality of different colors, certain of said colors including in their composition light substantially complementary to light included in the said certain chromatic color, said scene being illuminated by light of known spectral composition, including two complementary portions, which method includes the steps of restricting, by means of a character imparting element, placed in the path of the said light, the light reaching the eye to a predetermined known spectral composition, including two bright bands separated by a dark band, the said two bright bands being substantially complementary, said restricted spectral composition having substantially the same spectral center of gravity and hue as the said illuminating light, said restricted spectral composition being coordinated with the predetermined spectral composition of said chromatic color, one of said complementary bright bands including a certain selected portion of the spectrum of said chromatic color, the light of the said selected portion having a predetermined hue, brightness and chroma, said restricted spectral composition being limited substantially to the said selected portion of said chromatic color spectrum and light substantially complementary thereto, whereby the said chromatic color is enhanced in chroma by simultaneous contrast with its approximate complement, while any achromatic colors remain substantially achromatic.

14. The method of lending increased chroma to an object having a certain chromatic color of known spectral composition, which includes the steps of including the said object in a scene as one of a plurality of different colors, certain of said colors including in their spectral composition light substantially complementary to light included in said certain chromatic color, providing light, cooperating the said light with a character imparting element by placing said element in the path of the said light, during such cooperation said light after passing said element having a predetermined spectral composition including two bright spectral bands separated by a dark band, the said two bright bands being substantially complementary, said light having substantially the same spectral center of gravity and hue as an ordinary well-known illuminant, said spectral composition after said cooperation being coordinated with the composition of said chromatic color, one of said bright bands including a certain selected part of the said chromatic color, the light of the said selected portion having a predetermined hue and chroma, said predetermined composition of said light after said cooperation being restricted substantially to the said selected portion of said chromatic color, and light complementary thereto, illuminating the said scene by said light during said cooperation, whereby the said chromatic color is enhanced in chroma by simultaneous contrast with its complement, while any achromatic colors present remain substantially achromatic.

15. The method of changing the appearance of decorations and persons in a room, which includes the steps of illuminating the said room by an ordinary illuminant of predetermined known spectral composition, cooperating said illuminant with a character imparting element, placed in the path of the said light, after such cooperation the said light having a predetermined spectral composition consisting substantially of bright bands separated by a dark band, the spectral distribution and extent of said bright bands being coordinated with certain colors of said decorations and persons, and vice versa, said bright bands including and being included by certain portions of the spectral compositions respectively of said decorations and persons, the light of certain of said portions having a strong simultaneous contrast, the light of each included portion having increased chroma and a predetermined hue, the sum of the wavelengths of all but one of the said bands being approximately complementary to the one band, said light after such cooperation also having substantially the same spectral center of gravity and hue as the predetermined selected ordinary illuminant, whereby the chroma of certain colors of said decorations and persons is increased, while achromatic colors remain unchanged.

16. The method of increasing the recognizability of the color of a certain chromatic light having a substantially monocolored spectrum, which may be a line flame or spark spectrum, a band spectrum, or an ordinary continuous spectrum, said light being included in a scene otherwise illuminated by other light of known spectral composition including light of the color of the said chromatic light spectrum and light complementary thereto, which includes the steps of restricting, by means of a suitable filter, substantially homogeneous as to selective transmission throughout its area, the light reaching the eye substantially to a predetermined known spectral composition including bright bands separated by a dark band, the sum of the light of all but one of said bright bands being substantially complementary to the one bright band, said restricted spectral composition having substantially the same spectral center of gravity and hue as the said other illuminating light, said restricted spectral composition being coordinated with the said chromatic light spectrum, said restricted spectral composition including substantially only those positions in the spectrum which respectively are the color of the said chromatic light and a color approximately complementary thereto, whereby the chroma of the said chromatic light is increased, while any achromatic colors in said scene remain substantially achromatic.

17. The method of lending increased chroma to a chromatically colored light having a known polycolored spectral composition, which may be a line flame or spark spectrum, a band spectrum, or a continuous spectrum, when said light is included in a scene which is illuminated by other light of known spectral composition including two complementary portions, which method includes the steps of restricting by means of a suitable filter substantially homogeneous as to selective transmission throughout its area, light reaching the eye substantially to a predetermined known spectral composition including bright bands separated by a dark band, the sum of the light of all but one of said bright bands being substantially complementary to the one bright band, said restricted spectral composition having substantially the same spectral center of gravity and hue as the said other illuminating light, said restricted spectral composition being coordinated with the said chromatic light spectrum, one of said complementary bright bands including a certain selected portion of the spectrum of said chromatically colored light, which portion may be substantially all of said spectrum, the light of said selected portion having a predetermined hue and chroma, said restricted spectral composition being limited substantially to the said selected portion of said chromatic color spectrum and light complementary thereto, whereby the said chromatically colored light is enhanced in chroma by simultaneous contrast with its complement, and by removal of dechromatizing portions, while achromatic colors in said scene remain substantially achromatic.

18. The method of producing in a scene a visual effect including unusual chroma, which includes the steps of including in said scene two ordinary chromatic colors each including in its spectral composition light of a color complementary to that of the other said chromatic color, restricting by means of a suitable homogeneous absorption filter, the light reaching the eye to light of a known spectral composition, having substantially the same spectral center of gravity and hue as a selected illuminant, but consisting substantially of two bright spectral bands of approximately complementary color, having simultaneous contrast, each of said bands respectively including substantially only a selected predetermined portion of a different one of said chromatic color spectrums, whereby the chroma of each said color is increased by simultaneous contrast.

19. The method of producing in a scene a visual effect including unusual chroma, which includes the steps of including in said scene an ordinary chromatic color and an ordinary achromatic color, each of known predetermined spectral composition, restricting, by means of a suitable homogeneous absorption filter, the light reaching the eye to light of a known spectral composition having substantially the same spectral center of gravity and hue as a selected illuminant, but consisting substantially of two bright spectral bands of approximately complementary color, having simultaneous contrast, one of said bands including substantially only a selected portion of said chromatic color composition, both said bands being included in the composition of said achromatic color, whereby the chroma of said chromatic color is increased by simultaneous contrast, while said achromatic color appears as if illuminated by said selected ordinary illuminant.

20. Illuminating apparatus including a substantially homogeneous selective absorption filler having a predetermined selective transmission including spectral transmission bands separated by an absorption band, said transmission bands being substantially complementary, said selective transmission being so distributed spectrally as to have substantially the same spectral centroid as any certain selected ordinary illuminant.

21. The method of producing a radiation effect, which includes the steps of projecting radiation on a plurality of objects including a selective character imparting element having a certain desirable radiation effect dependent on the range and character of the included wavelengths relative to the dominant wavelength of the radiation, and restricting, by means of a suitable selective filter, the radiation reaching a suitable character detecting element from the said character imparting element to radiation comprised only of wavelengths the sum of which has a desired purity of the selected character, and wavelengths strongly contrasting in effect, the spectral transmission of the said selective filter having the same spectral center of gravity as said radiation before said selection or restriction, but consisting of a plurality of transmission bands separated by bands of substantially no transmission.

In testimony whereof, I affix my signature.

WILLIAM J. WHITING.

CERTIFICATE OF CORRECTION.

Patent No. 1,768,813.  Granted July 1, 1930, to

WILLIAM J. WHITING.

It is hereby certified that error appears in the printed specification of the above numbered patent requiring correction as follows: Page 4, line 37, for the word "contact" read constant, and line 89, for "solective" read selective; page 5, line 79, for "means" read mean; line 102, claim 1, for "acromatic" read achromatic; line 104, claim 2, for "inclding" read including; page 8, line 113, claim 20, for "filler" read filter; and that the said Letters Patent should be read with these corrections therein that the same may conform to the record of the case in the Patent Office.

Signed and sealed this 21st day of October, A. D. 1930.

(Seal)

M. J. Moore,
Acting Commissioner of Patents.